United States Patent
Jeon et al.

(10) Patent No.: US 8,816,025 B2
(45) Date of Patent: Aug. 26, 2014

(54) PRESSURE-SENSITIVE ADHESIVE COMPOSITION

(71) Applicant: LG Chem, Ltd., Seoul (KR)

(72) Inventors: Jong Rok Jeon, Daejeon (KR); Se Woo Yang, Daejeon (KR); Suk Ky Chang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/897,973

(22) Filed: May 20, 2013

(65) Prior Publication Data

US 2013/0331522 A1   Dec. 12, 2013

(30) Foreign Application Priority Data

May 18, 2012   (KR) ......................... 10-2012-0053208

(51) Int. Cl.
| | | |
|---|---|---|
| *C08F 2/38* | (2006.01) | |
| *C08F 2/00* | (2006.01) | |
| *C08F 20/06* | (2006.01) | |
| *C08F 118/02* | (2006.01) | |
| *C08F 283/00* | (2006.01) | |
| *C08L 31/00* | (2006.01) | |

(52) U.S. Cl.
USPC .......... 526/84; 526/210; 526/317.1; 526/319; 524/457; 524/556

(58) Field of Classification Search
CPC .... C09J 133/066; C09J 133/08; C09J 133/10; C09J 133/12; C09D 7/1241; C08G 18/3203; C08G 18/3215; C08G 18/3237
USPC .......... 526/84, 210, 317.1, 319; 524/556, 457
See application file for complete search history.

(56) References Cited

U.S. PATENT DOCUMENTS 7,863,485 B2 *   1/2011   Cook et al. .................... 564/283

* cited by examiner

*Primary Examiner* — William Cheung
(74) *Attorney, Agent, or Firm* — McKenna Long & Aldridge, LLP

(57) ABSTRACT

There is provided a pressure sensitive adhesive composition and a pressure sensitive adhesive. A pressure sensitive adhesive composition example of the present application can provide a pressure sensitive adhesive having, for example, a high shear resistance together with an excellent peeling property or tacking property with respect to an attachment target surface.

14 Claims, No Drawings

PRESSURE-SENSITIVE ADHESIVE COMPOSITION

This application is a Utility Application which claims priority to and the benefit of Korean Patent Application No. 10-2012-0053208 filed on May 18, 2012, which are hereby incorporated by reference in its entirety herein.

TECHNICAL FIELD

The present application relates to a pressure sensitive adhesive composition and a pressure sensitive adhesive.

BACKGROUND ART

A pressure sensitive adhesive has viscosity at room temperature and has adhesion upon application of a light pressure without activation of heat, water, a solvent, or the like. Further, the pressure sensitive adhesive shows a strong holding force after being attached and can be removed without leaving residue. Furthermore, the pressure sensitive adhesive has many advantages including adhesiveness and elasticity. Thus, it has been widely used in various fields.

As the pressure sensitive adhesive, a rubber-based adhesive using natural rubber or synthetic rubber, an acryl adhesive, a silicon adhesive, or the like are known. The acryl adhesive is optically transparent and has a high weather resistance or a high resistance to oxidation. Thus, it has been applied in various fields.

The acryl adhesive can be classified into a solvent-based adhesive, a water-based adhesive, a hot melt adhesive, a radiation-curing adhesive, or the like. Typically, the acryl adhesive is manufactured by chemically cross-linking an acryl polymer as an adhesive resin with a cross-linker or the like. However, in a chemically cross-linked adhesive, there tends to be a tradeoff between a hardness property of the adhesive and other properties such as a tacking property or a peeling property. Thus, it is not easy to adjust all properties to be as required.

DISCLOSURE

Technical Problem

The present application provides a pressure sensitive adhesive composition and a pressure sensitive adhesive.

Technical Solution

An example of a pressure sensitive adhesive composition of the present application includes an adhesive acryl polymer and a polyphenolic compound. The polyphenolic compound can affect adhesiveness of a pressure sensitive adhesive through an interaction with a functional group such as a hydroxyl group or a carboxyl group contained in the acryl polymer, and can enhance a shear resistance of the pressure sensitive adhesive. Further, the polyphenolic compound enables the pressure sensitive adhesive to have a high shear resistance together with an improved tacking property or peeling property which tends to be contrary to the shear resistance in a typical adhesive.

In an example, the pressure sensitive adhesive composition may comprise an adhesive acryl polymer containing a hydroxyl group or a carboxyl group and a polyphenolic compound in an amount of 0.1 parts by weight to 20 parts by weight relative to 100 parts by weight of the acryl polymer.

In an example, the pressure sensitive adhesive composition may satisfy a condition of General Formula 1 below.

$$95\% \geq (X2/X1) \times 100 = \Delta X.$$ [General Formula 1]

In General Formula 1, $\Delta X$ represents a change in creep of a pressure sensitive adhesive before and after addition of the polyphenolic compound, X1 represents creep of a pressure sensitive adhesive prepared from a pressure sensitive adhesive composition excluding the polyphenolic compound from the pressure sensitive adhesive composition, and X2 represents creep of a pressure sensitive adhesive prepared from the pressure sensitive adhesive composition containing the polyphenolic compound. That is, the change in creep is expressed as a percentage of the creep X2 of the pressure sensitive adhesive prepared from the pressure sensitive adhesive composition containing the polyphenolic compound to the creep X1 of the pressure sensitive adhesive prepared from a pressure sensitive adhesive composition excluding the polyphenolic compound from the pressure sensitive adhesive composition.

The creep is measured when a specimen having a width of 2.5 cm, a length of 2.5 cm, and a thickness of 40 μm produced with the pressure sensitive adhesive from the pressure sensitive adhesive composition is attached to glass and a load of 1 kg is applied to the specimen for 500 seconds. Details of a method for measuring the creep can be confirmed from a method for measuring creep of a pressure sensitive adhesive described in an Example.

In another example, $\Delta X$ may be 90% or less, 85% or less, 80% or less, 75% or less, 70% or less, or 65% or less. Further, a lower limit of $\Delta X$ is not particularly limited and may be, for example, 30% or more, 35% or more, 45% or more, 50% or more, 55% or more, or 60% or more.

The pressure sensitive adhesive composition may satisfy a condition of General Formula 1 below.

$$106\% \leq (Y2/Y1) \times 100 = \Delta Y$$ [General Formula 2]

In General Formula 2, $\Delta Y$ represents a change in a peel strength of a pressure sensitive adhesive before and after addition of the polyphenolic compound, Y1 represents a peel strength of a pressure sensitive adhesive prepared from a pressure sensitive adhesive composition excluding the polyphenolic compound from the pressure sensitive adhesive composition, and Y2 represents a peel strength of a pressure sensitive adhesive prepared from the pressure sensitive adhesive composition containing the polyphenolic compound. That is, the change in the peel strength is expressed as a percentage of the peel strength Y2 of the pressure sensitive adhesive prepared from the pressure sensitive adhesive composition containing the polyphenolic compound to the peel strength Y1 of the pressure sensitive adhesive prepared from a pressure sensitive adhesive composition excluding the polyphenolic compound from the pressure sensitive adhesive composition.

The peel strength is measured when a specimen having a width of 2.5 cm, a length of 2.5 cm, and a thickness of 40 μm produced with the pressure sensitive adhesive from the pressure sensitive adhesive composition is attached to glass and then peeled from the glass in a longitudinal direction at 25° C. at a peeling rate of 5 mm/sec at a peeling angle of 180 degrees. Details of a method for measuring the peel strength can be confirmed from a method for measuring a peel strength of a pressure sensitive adhesive described in an Example.

In another example, $\Delta Y$ may be 110% or more, 115% or more, 120% or more, 125% or more, 130% or more, or 135% or more. Further, an upper limit of $\Delta Y$ is not particularly limited and may be, for example, 400% or less, 350% or less, 300% or less, 250% or less, 200% or less, 150% or less, or 145% or less.

The pressure sensitive adhesive composition may satisfy only one or both of General Formulas 1 and 2 above.

The pressure sensitive adhesive composition may satisfy the condition of General Formula 1 or 2 due to the presence of the polyphenolic compound and the acryl polymer which can interact with the polyphenolic compound. Therefore, the pressure sensitive adhesive composition has an excellent tacking property and peeling property as well as a high shear resistance.

A kind of the acryl polymer contained in the pressure sensitive adhesive composition is not particularly limited. In an example, the acryl polymer may include a carboxyl group or a hydroxyl group. The functional group can give adhesiveness to a pressure sensitive adhesive through a reaction with a multifunctional cross-linker to be described below, and can also adjust properties of the pressure sensitive adhesive through an interaction or a reaction with the polyphenolic compound.

In an example, the acryl polymer may comprise a polymerization unit induced from a copolymeric monomer containing a carboxyl group or a hydroxyl group and a (meta)acrylic acid ester compound. For example, the acryl polymer may comprise a polymerization unit induced from a copolymeric monomer containing a hydroxyl group or a carboxyl group in an amount of 0.05 parts by weight to 30 parts by weight, and a (meta)acrylic acid ester compound in an amount of 70 parts by weight to 99.95 parts by weight. In another example, the acryl polymer may comprise a polymerization unit induced from a copolymeric monomer containing a hydroxyl group or a carboxyl group in an amount of 0.1 parts by weight to 25 parts by weight and a (meta)acrylic acid ester compound in an amount of 75 parts by weight to 99.9 parts by weight. In the present specification, the unit "parts by weight" may mean a weight ratio between components unless otherwise specified. That is, for example, when the acryl polymer contains a (meta)acrylic acid ester compound in an amount of 70 parts by weight to 99.95 parts by weight, and a copolymeric monomer containing a carboxyl group or a hydroxyl group in an amount of 0.05 parts by weight to 30 parts by weight, a weight ratio of the (meta)acrylic acid ester compound to the copolymeric monomer may be about 70 to 99.95: 0.50 to 30 ((meta) acrylic acid ester compound: copolymeric monomer). If the acryl polymer contains the respective monomers in the above-described ratio range, an interaction or a reaction between the aryl polymer and a cross-linker or a polyphenolic compound can be induced appropriately.

For example, the (meta)acrylic acid ester monomer may include, but is not limited to, alkyl (meta)acrylate containing an alkyl group having 1 to 14 carbon atoms such as methyl (meta)acrylate, ethyl (meta)acrylate, n-propyl (meta)acrylate, isopropyl meta)acrylate, n-butyl (meta)acrylate, t-butyl (meta)acrylate, sec-butyl (meta)acrylate, pentyl (meta)acrylate, 2-ethylhexyl (meta)acrylate, 2-ethylbutyl (meta)acrylate, n-octyl (meta)acrylate, isooctyl (meta)acrylate, isononyl (meta)acrylate, isobornyl meta)acrylate, lauryl (meta)acrylate, or tetradecyl (meta)acrylate, or (meta)acrylate containing an aromatic residue such as benzyl acrylate or phenoxy acrylate.

For example, the copolymeric monomer containing a hydroxyl group or a carboxyl group may include any kind of a compound as long as it has the carboxyl group or the hydroxyl group and a copolymeric part and can form an acryl polymer by being copolymerized with a monomer such as a (meta)acrylate ester compound or the like and give the carboxyl group or the hydroxyl group to the formed acryl polymer. Such a monomer may include, but is not limited to, carboxyl group-containing monomers such as an acrylic acid, a methacrylic acid, a 2-(meta)acryloyoxy acetic acid, a 3-(meta)acryloyoxy propylic acid, a (meta)acryloyoxy butylic acid, an acrylic acid dimer, an itaconic acid, a maleic acid, or a maleic acid anhydride, hydroxyl group-containing monomers such as 2-hydroxyethyl (meta)acrylate, 2-hydroxypropyl (meta)acrylate, 3-hydroxypropyl (meta)acrylate, 4-hydroxybutyl (meta)acrylate, 6-hydroxyhexyl (meta)acrylate, 8-hydroxyoctyl (meta)acrylate, 2-hydroxyethyleneglycol meta)acrylate, or 2-hydroxypropyleneglycol (meta)acrylate.

The acryl polymer may further contain other copolymeric monomers as necessary. The other copolymeric monomers may include, but are not limited to, nitrogen-containing monomers such as (meta)acrylamide, N-butoxy methyl (meta)acrylamide, N-methyl (meta)acrylamide, (meta)acrylonitrile, N-vinyl pyrrolidone, or N-vinyl caprolactame; styrene-based monomers such as styrene or methyl styrene; glycidyl (meta)acrylate; and vinyl ester of a carboxylic acid such as caprolactone or vinyl acetate.

The acryl polymer may be prepared by a polymerization process, such as solution polymerization, photopolymerization, mass-polymerization, suspension polymerization, or emulsion polymerization, of a mixture of the above-described monomers.

The acryl polymer may have a weight average molecular weight (Mw) in a range of 5,000 to 2,000,000, 10,000 to 1,500,000, or 500,000 to 1,000,000. In the present specification, the weight average molecular weight may mean a conversion value with respect to standard polystyrene measured by using a GPC (Gel Permeation Chromatograph), and a molecular weight may mean the weight average molecular weight unless otherwise specified. If a molecular weight of the acryl polymer is too low, adhesiveness of an adhesive layer may be decreased, and if a molecular weight of the acryl polymer is too high, an adhesive property may be decreased. Therefore, a molecular weight can be selected appropriately in consideration of this matter.

The acryl polymer may have a glass transition temperature (Tg) in a range of, desirably, 10° C. or less, 5° C. or less, 0° C. or less, −5° C. or less, −10° C. or less, −20° C. or less, or −30° C. or less. A lower limit of the Tg may be −100° C. or more, −90° C. or more, −80° C. or more, −70° C. or more, −60° C. or more, −50° C. or more, or −40° C. or more. By setting the Tg of the acryl polymer in the above-described ranges, it is possible to appropriately obtain a tacking property, a peeling property, and a shear resistance.

The pressure sensitive adhesive composition contains a polyphenolic compound. For example, the polyphenolic compound forms a physically or chemically cross-linked structure through an interaction or a reaction with an acryl polymer, and thus can adjust properties of a pressure sensitive adhesive. In an example, a phenolic hydroxyl group contained in the polyphenolic compound can increase viscosity and hardness of a resin through an interaction, for example, formation of a hydrogen bond, with a hydroxyl group or a carboxyl group of the acryl polymer. Further, for example, the polyphenolic compound can increase a peel strength or decrease a tradeoff between a tacking force and a peel strength caused by an increase in hardness through various interactions with an attachment target surface of the pressure sensitive adhesive.

A kind of the polyphenolic compound used above is not particularly limited and may use, for example, a compound of Chemical Formula 1 or a compound containing a substituent of Chemical Formula 2. For example, the compound of Chemical Formula 1 or the compound containing the substituent of Chemical Formula 2 may have a molecular weight of about 100 g/mol to about 30,000 g/mol. In another example, the polyphenolic compound may have a molecular weight of about 100 g/mol to about 25,000 g/mol, about 100 g/mol to about 20,000 g/mol, about 100 g/mol to about 15,000 g/mol, about 100 g/mol to about 10,000 g/mol, about 100 g/mol to about 5,000 g/mol, about 100 g/mol to about 4,000 g/mol, about 100 g/mol to about 3,000 g/mol, or about 100 g/mol to about 2,500 g/mol. By using the polyphenolic compound expressed by Chemical Formula 1 or containing the substituent of Chemical Formula 2 with a molecular weight in the above-described ranges, it is possible to induce an appropriate interaction or reaction between the compound and the acryl polymer or the attachment target surface.

[Chemical Formula 1]

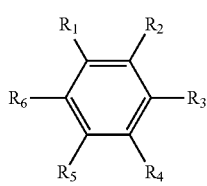

In Chemical Formula 1, $R_1$ to $R_6$ independently represent hydrogen, a hydroxyl group, an epoxy group, a carboxyl group, an alkyl group, an alkoxy group, an alkenly group, an alkynyl group, or an isocyanate group, and two or more of the $R_1$ to $R_6$ in Chemical Formula 1 are hydroxyl groups (except cases where $R_1$ and $R_4$, $R_2$ and $R_5$, or $R_3$ and $R_6$ are hydroxyl groups simultaneously).

[Chemical Formula 2]

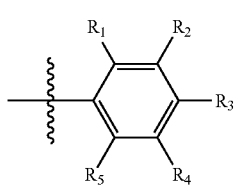

In Chemical Formula 2, $R_1$ to $R_5$ independently represent hydrogen, a hydroxyl group, an epoxy group, a carboxyl group, an alkyl group, an alkoxy group, an alkenly group, an alkynyl group, or an isocyanate group, and two or more of the $R_1$ to $R_5$ are hydroxyl groups (except cases where $R_1$ and $R_4$ or $R_2$ and $R_5$ are hydroxyl groups simultaneously).

In Chemical Formula 2, the mark

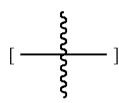

may mean that the substituent of Chemical Formula 2 is linked to a mother compound at the marked site. In an example, the mark

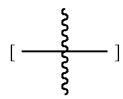

may mean that the substituent of Chemical Formula 2 is linked to a mother compound directly or via an appropriate linkage. For example, the linkage may include —COO—, —OCO—, —O—, —S—, an alkylene group having 1 to 20 carbon atoms, or an arylene group having 6 to 20 carbon atoms.

A kind of the mother compound is not particularly limited. For example, the mother compound may include benzene, pyran, benzopyran, dihydrobenzopyran, chromone, coumarin, flavonoid, a gallic acid, a hexose, the compound of Chemical Formula 1, or a compound prepared by reacting two or more of the above-described materials. The mother compound may be substituted by an arbitrary substituent such as a hydroxyl group, an epoxy group, a carboxyl group, an alkyl group, an alkoxy group, an alkenly group, an alkynyl group, or an isocyanate group in addition to the substituent of Chemical Formula 2.

In the present specification, the term "alkyl group" may mean a straight chain, branched chain or cyclic alkyl group having 1 to 20 carbon atoms, 1 to 16 carbon atoms, 1 to 12 carbon atoms, 1 to 8 carbon atoms, or 1 to 4 carbon atoms unless otherwise specified. Further, the alkyl group may be substituted arbitrarily by one or more substituents as necessary.

Further, in the present specification, the term "alkoxy group" may mean a straight chain, branched chain or cyclic alkoxy group having 1 to 20 carbon atoms, 1 to 16 carbon atoms, 1 to 12 carbon atoms, 1 to 8 carbon atoms, or 1 to 4 carbon atoms unless otherwise specified. Further, the alkoxy group may be substituted arbitrarily by one or more substituents as necessary.

Furthermore, in the present specification, the term "alkenly group" may mean a straight chain, branched chain or cyclic alkenly group having 2 to 20 carbon atoms, 2 to 16 carbon atoms, 2 to 12 carbon atoms, 2 to 8 carbon atoms, or 2 to 4 carbon atoms unless otherwise specified. Further, the alkenly group may be substituted arbitrarily by one or more substituents as necessary.

Moreover, in the present specification, the term "alkynyl group" may mean a straight chain, branched chain or cyclic alkynyl group having 2 to 20 carbon atoms, 2 to 16 carbon atoms, 2 to 12 carbon atoms, 2 to 8 carbon atoms, or 2 to 4 carbon atoms unless otherwise specified. Further, the alkynyl group may be substituted arbitrarily by one or more substituents as necessary.

In an example, the polyphenolic compound may use a compound of Chemical Formula 1 in which two, three or more of the $R_1$ to $R_6$ are hydroxyl groups and the other substituents are hydrogen, a carboxyl group, an alkyl group having 1 to 20 carbon atoms, 1 to 16 carbon atoms, 1 to 12 carbon atoms, 1 to 8 carbon atoms, or 1 to 4 carbon atoms, or an alkoxy group having 1 to 20 carbon atoms, 1 to 16 carbon atoms, 1 to 12 carbon atoms, 1 to 8 carbon atoms, or 1 to 4 carbon atoms independently. Among the $R_1$ to $R_6$, the substituents other than the hydroxyl groups may be, for example, hydrogen, a carboxyl group, or an alkyl group having 1 to 4 carbon atoms independently.

Further, for example, the polyphenolic compound may use a compound containing one or more substituents of Chemical Formula 2 in which two, three or more of the $R_1$ to $R_5$ are hydroxyl groups and the other substituents are hydrogen, a carboxyl group, an alkyl group having 1 to 20 carbon atoms, 1 to 16 carbon atoms, 1 to 12 carbon atoms, 1 to 8 carbon atoms, or 1 to 4 carbon atoms, or an alkoxy group having 1 to 20 carbon atoms, 1 to 16 carbon atoms, 1 to 12 carbon atoms, 1 to 8 carbon atoms, or 1 to 4 carbon atoms independently. In an example, the compound may contain 1 to 10, 1 to 9, 1 to 8, 1 to 7, or 1 to 6 substituents expressed by Chemical Formula 2. Further, among the $R_1$ to $R_5$, the substituents other than the hydroxyl groups may be, for example, hydrogen, a carboxyl group, or an alkyl group having 1 to 4 carbon atoms independently.

For example, the compound of Chemical Formula 1 or the compound containing the substituent of Chemical Formula 2 may be flavonoid-based polyphenols such as 1,2-benzenediol, 1,3-benzenediol, 1,2,3-benzentriol, a gallic acid, catechin, or quercetin, a tannic acid, or the like.

In an example, in order for the pressure sensitive adhesive composition to contain the polyphenolic compound, an extract of a plant containing the polyphenolic compound may be mixed with the pressure sensitive adhesive composition. For example, an extract obtained from a fruit skin or seeds of a plant containing the polyphenolic compound may be mixed with the acryl compound, so that the polyphenolic compound can be contained in the composition. For example, the fruit skin or the seeds of the plant containing the polyphenolic compound may include grape seeds, apricot seeds, grape skin, apple skin, pear skin, or the like. Further, a method for obtaining an extract containing the polyphenolic compound from the plant is not particularly limited and may employ a method publicly known in the art. For example, there may be used an extract obtained by using water, ethanol, or an aqueous-ethanol solution as an extraction solvent. Further, a method for adjusting extraction efficiency of the extract by increasing a temperature of the solvent may be further added, but the present invention is not limited thereto.

The polyphenolic compound may be contained in an amount of, for example, 0.1 parts by weight to 20 parts by weight, 0.1 parts by weight to 15 parts by weight, 0.1 parts by weight to 10 parts by weight, 0.1 to 8 parts by weight, 0.1 parts by weight to 5 parts by weight, or 0.1 parts by weight to 3 parts by weight relative to 100 parts by weight of the acryl polymer. If a ratio of the polyphenolic compound is too low, an effect caused by addition of the polyphenolic compound may be insignificant, and if a ratio of the polyphenolic compound is too high, compatibility with other components of the composition may be decreased. Therefore, a ratio can be selected appropriately in consideration of an effect expected by addition of the polyphenolic compound and the above-described contents.

The pressure sensitive adhesive composition may further contain a multifunctional cross-linker. For example, the cross-linker can form a cross-linked structure through a reaction with a cross-linkable functional group of the acryl polymer and can enhance adhesiveness of the pressure sensitive adhesive.

The multifunctional cross-linker may employ cross-linkers publicly known in the art without particular limitation. For example, the cross-linker may include an isocyanate cross-linker, an epoxy cross-linker, an aziridine cross-linker, or a metal chelate cross-linker.

The isocyanate cross-linker may include a multifunctional isocyanate compound such as tolylene diisocyanate, xylene diisocyanate, diphenylmethane diisocyanate, hexamethylene diisocyanate, isoboron diisocyanate, tetramethylxylene diisocyanate, or naphthalene diisocyanate or a compound obtained by reacting one or more selected from the above-described isocyanate compounds with polyol such as trimethylol propane. The epoxy cross-linker may include ethyleneglycol diglycidylether, triglycidylether, trimethylolpropane triglycidylether, N,N,N',N'-tetraglycidyl ethylenediamine, N,N,N',N'-tetraglycidyl-m-xylylenediamine, or glycerin diglycidylether. As the epoxy cross-linker, there may be used a compound Tetrad X produced and distributed by Mitsubishi Gas Chemical Company as a tetrafunctional epoxy cross-linker. The aziridine cross-linker may include N,N'-toluene-2,4-bis(1-aziridinecarboxamide), N,N'-diphenylmethane-4,4'-bis(1-aziridinecarboxamide), triethylene melamine, bisisoprothaloyl-1-(2-methylaziridine), or tri-1-aziridinylphosphineoxide. Furthermore, the metal chelate cross-linker may include a compound in which a multivalent metal such as aluminum, iron, zinc, tin, titanium, antimony, magnesium, or vanadium is coordinated with a compound such as acetyl acetone or acetoacetic acid ethyl, but the present invention is not limited thereto.

A content of the multifunctional cross-linker in the pressure sensitive adhesive composition is not particularly limited and may be selected in consideration of the effect of the present invention. For example, the cross-linker may be contained in an amount of 0.01 parts by weight to 10 parts by weight, 0.01 parts by weight to 5 parts by weight, or 0.01 parts by weight to 1 part by weight relative to 100 parts by weight of the acryl polymer.

The pressure sensitive adhesive composition may further contain an initiator such as a thermal initiator or a photo initiator; an epoxy resin; a hardener; a UV stabilizer; an antioxidant; a colorant; a reinforcing agent; a filler; an antifoamer; a surfactant; a photopolymeric compound such as multifunctional acrylate; or an additive such as a plasticizer, in a range which does not affect the effect of the present invention.

After the cross-liked structure is formed, the pressure sensitive adhesive composition may have a gel fraction calculated by Formula 3 below in a range of 40% to 80%, 40% to 75%, 40% to 70%, 45% to 70%, 45% to 65%, or 50% to 65%.

$$\text{Gel fraction}(\%) = 100 \times A/B \quad \text{[Formula 3]}$$

In Formula 3, B represents a weight of the pressure sensitive adhesive composition including the cross-linked structure, and A represents a dry weight of insolubles remaining after the pressure sensitive adhesive composition having the weight B is kept in ethyl acetate for 72 hours. By setting a gel fraction of the pressure sensitive adhesive composition in the above-described ranges, it is possible to appropriately obtain a tacking property, a peeling property, and a shear resistance.

The present application also relates to a pressure sensitive adhesive. The pressure sensitive adhesive may contain, for example, the pressure sensitive adhesive composition including a cross-linked structure.

In an example, a pressure sensitive adhesive including the cross-linked structure can be prepared by curing the pressure sensitive adhesive composition. In the present specification, the term "curing" may mean an expression process of an adhesive property of the pressure sensitive adhesive composition through a chemical or physical reaction or interaction of respective components contained in the pressure sensitive adhesive composition. A method for curing the pressure sensitive adhesive composition including the cross-linked structure is not particularly limited and may employ a general method publicly known in the art depending on the composition of the pressure sensitive adhesive composition. In an example, the pressure sensitive adhesive may be prepared by coating the pressure sensitive adhesive composition or a coating solution containing the same on an adequate processing substrate and maintaining a coating layer at an adequate temperature for a certain time period such that a cross-linking reaction between the cross-linker and the acryl polymer can be induced within the coating layer.

In an example, the pressure sensitive adhesive including the cross-linked structure may be formed on a substrate or a release film and used in the form of an adhesive film.

A kind of the substrate or the release film used in this case is not particularly limited and may employ substrates or release films typically used in the adhesive film manufacturing field without limitation.

Further, a thickness of a layer of the pressure sensitive adhesive formed on the substrate or the release film is not particularly limited and may be selected in a range appropriate for a purpose.

Effects of the Invention

A pressure sensitive adhesive composition example of the present application can provide a pressure sensitive adhesive having, for example, a high shear resistance together with an excellent peeling property or tacking property with respect to an attachment target surface.

BEST MODE

Hereinafter, the above-described pressure sensitive adhesive composition will be explained in detail with reference to Examples and Comparative Examples, but a scope of the above pressure sensitive adhesive composition is not limited to the Examples provided below.

Properties of Examples and Comparative Examples were evaluated by the following methods.

1. Viscosity After Mixing of Polyphenolic Compound

A pressure sensitive adhesive composition prepared in an Example or Comparative Example was stirred by a stirrer at 200 rpm for 20 minutes. Then, it was kept at room temperature for 1 hour so as to remove bubbles formed during the stirring. Thereafter, its viscosity was measured at room temperature by using a viscometer.

2. Evaluation of Compatibility of Polyphenolic Compound

A pressure sensitive adhesive composition prepared in an Example or Comparative Example was stirred by a stirrer at 200 rpm for 20 minutes. Then, it was kept at room temperature for 1 hour so as to remove bubbles formed during the stirring. Thereafter, a haze on the pressure sensitive adhesive composition was examined with the naked eye and compatibility of the pressure sensitive adhesive composition was evaluated.

<Compatibility Evaluation Criteria>

O: A case where a haze was not observed with the naked eye

X: A case where a haze was observed with the naked eye.

3. Evaluation of Creep

A specimen having a width of 2.5 cm, a length of 2.5 cm, and a thickness of 40 μm was produced with a pressure sensitive adhesive prepared in an Example or Comparative Example and attached to glass and kept at room temperature for 1 day. Then, creep was measured when a load of 1 kg was applied to the specimen at room temperature for 500 seconds by using a tensile tester.

4. Evaluation of Peel Strength

A specimen having a width of 2.5 cm, a length of 2.5 cm, and a thickness of 40 μm was produced with a pressure sensitive adhesive prepared in an Example or Comparative Example and attached to glass. 30 minutes later, a peel strength was evaluated. The peel strength was measured when the specimen was peeled from the glass in a longitudinal direction at room temperature at a peeling rate of 5 mm/sec at a peeling angle of 180 degrees by using a tensile tester.

5. Measurement of Gel Fraction

About 0.3 g of a pressure sensitive adhesive prepared in an Example or Comparative Example was collected and put into a 200 mesh stainless steel sieve. Then, the pressure sensitive adhesive was deposited in ethyl acetate and kept in a darkroom at room temperature for 3 days. Thereafter, the pressure sensitive adhesive (insolubles) which was not dissolved in the ethyl acetate was collected and dried in an oven at 70° C. for 4 hours. Then, a weight (a dry weight in the unit of g) thereof was measured and substituted into General Formula 3 below so as to measure a gel fraction.

Gel fraction(%)=(Measured dry weight)/0.3×100 [General Formula 3]

PREPARATION EXAMPLE 1

Butyl acrylate in an amount of 90 parts by weight and an acrylic acid in an amount of 10 parts by weight were put into a reactor in which a nitrogen gas was refluxed and a cooling device was provided so as to easily control a temperature, and ethyl acetate (EAc) was added thereto as a solvent. Then, the nitrogen gas was purged for 20 minutes in order to remove oxygen and a temperature was maintained at 60° C. While a mixture was uniformalized, azobisisobutyronitrile (AIBN) diluted in ethyl acetate to an adequate concentration was added thereto as a reaction initiator and reacted for 8 hours. After the reaction, a reaction product was diluted in ethyl acetate, thereby preparing an acryl polymer solution (A) having a molecular weight of 800,000 and a solid content of 17 wt. %.

PREPARATION EXAMPLE 2

An acryl polymer solution (B) was prepared in the same manner as Preparation Example 1 except that butyl acrylate in an amount of 90 parts by weight, isobornyl acrylate in an amount of 9 parts by weight, and 4-hydroxybutyl acrylate in an amount of 1 part by weight were used instead of butyl acrylate in an amount of 90 parts by weight and an acrylic acid in an amount of 10 parts by weight used in Preparation Example 1.

PREPARATION EXAMPLE 3

An acryl polymer solution (C) was prepared in the same manner as Preparation Example 1 except that butyl acrylate in an amount of 75 parts by weight, isobornyl acrylate in an amount of 5 parts by weight, and 2-hydroxyethyl acrylate in an amount of 20 parts by weight were used instead of butyl acrylate in an amount of 90 parts by weight and an acrylic acid in an amount of 10 parts by weight used in Preparation Example 1.

EXAMPLE 1

Tetrad X (Mitsubishi Gas Chemical Company) as a tetrafunctional epoxy cross-linker in an amount of about 0.03 parts by weight, and catechol as a polyphenolic compound in an amount of 1.0 part by weight relative to 100 parts by weight of a solid of the acryl polymer solution (A), were mixed together and diluted to an adequate concentration in consideration of a coating property, thereby preparing a pressure sensitive adhesive composition. Then, the prepared pressure sensitive adhesive composition was coated on one side of a PET (poly(ethylene terephthalate)) film having a thickness of 100 μm so as to have a thickness of about 40 μm after a dry process and kept at room temperature for 3 days, thereby forming a pressure sensitive adhesive layer.

EXAMPLES 2 TO 7 AND COMPARATIVE EXAMPLES 1 TO 4

Pressure sensitive adhesive compositions and pressure sensitive adhesives were prepared in the same manner as Example 1 except that a kind and a ratio of an acryl polymer and a polyphenolic compound were changed as shown in Table 1 below during a pressure sensitive adhesive composition preparation process.

TABLE 1

|  |  | Example | | | | | | | Comparative Example | | | |
|---|---|---|---|---|---|---|---|---|---|---|---|---|
|  |  | 1 | 2 | 3 | 4 | 5 | 6 | 7 | 1 | 2 | 3 | 4 |
| Polymer solution | (A) | 100 | 100 | 100 | 100 | 100 | — | — | 100 | 100 | — | — |
|  | (B) | — | — | — | — | — | 100 | — | — | — | 100 | — |
|  | (C) | — | — | — | — | — | — | 100 | — | — | — | 100 |
| Cross-linker content | | 0.03 | 0.03 | 0.03 | 0.03 | 0.03 | 0.03 | 0.03 | 0.03 | 0.03 | 0.03 | 0.03 |
| Polyphenol content | Catechol | 1.0 | — | — | — | — | — | — | — | — | — | — |
|  | Catechin | — | 1.0 | — | — | — | 1.0 | 1.0 | — | — | — | — |
|  | Gallic acid | — | — | 1.0 | — | — | — | — | — | — | — | — |
|  | Tannic acid | — | — | — | 1.0 | — | — | — | — | — | — | — |
|  | Plant extract | — | — | — | — | 1.0 | — | — | — | — | — | — |
|  | Hydroquinone | — | — | — | — | — | — | — | — | 1.0 | — | — |

Content unit: Parts by weight
Polymer solution content: Solid content contained in polymer solution
Plant extract: Extract obtained from grape seeds by using water of about 70° C.

Results of evaluating properties of the Examples and Comparative Examples are shown in Table 2 below.

wherein in General Formulas 1 and 2, ΔX represents a change in creep of a pressure sensitive adhesive before and after addition of the polyphenolic compound, ΔY represents a change in a peel strength of the pressure sensitive adhesive before and after addition of the polyphenolic compound, X1 and Y1 respectively represent creep and a peel strength of a pressure sensitive adhesive prepared from a pressure sensitive adhesive composition excluding the polyphenolic compound from the pressure sensitive adhesive composition, X2 and Y2 respectively represent creep and a peel strength of a pressure sensitive adhesive prepared from the pressure sensitive adhesive composition containing the polyphenolic compound, the creep is measured when a specimen having a width of 2.5 cm, a length of 2.5 cm, and a thickness of 40 μm produced with the pressure

TABLE 2

|  |  | Example | | | | | | | Comparative Example | | | |
|---|---|---|---|---|---|---|---|---|---|---|---|---|
|  |  | 1 | 2 | 3 | 4 | 5 | 6 | 7 | 1 | 2 | 3 | 4 |
| Viscosity (cP) | | 1500 | 1450 | 1300 | 1700 | 1750 | 1700 | 1800 | 900 | 1000 | 1050 | 1100 |
| Compatibility | | ○ | ○ | 603 | ○ | ○ | ○ | ○ | — | ○ | — | — |
| Peel strength (g/inch) | Glass | 2500 | 2600 | 2450 | 2700 | 2700 | 2430 | 1400 | 1950 | 2050 | 1800 | 1000 |
|  | Aluminum plate | 1200 | 1150 | 1350 | 1250 | 1300 | 700 | 900 | 900 | 950 | 400 | 600 |
|  | Urethane film | 620 | 500 | 490 | 525 | 530 | 350 | 700 | 450 | 450 | 200 | 450 |
| Creep (μm) | | 220 | 210 | 220 | 191 | 180 | 220 | 250 | 290 | 280 | 310 | 330 |
| Gel fraction (%) | | 54 | 55 | 56 | 57 | 57 | 60 | 55 | 56 | 55 | 60 | 55 |
| ΔX (%) | | 75.9 | 72.4 | 75.9 | 65.9 | 62.1 | 71.0 | 75.8 | — | 96.6 | — | — |
| ΔY (%) | | 128 | 133 | 126 | 138 | 138 | 135 | 140 | — | 105 | — | — |

Viscosity: Viscosity at room temperature after blending of polyphenol
Compatibility: Compatibility of polyphenolic compound

The invention claimed is:

1. A pressure sensitive adhesive composition comprising:
an adhesive acryl polymer containing a hydroxyl group or a carboxyl group;
and
a polyphenolic compound in an amount of 0.1 parts by weight to 20 parts by weight relative to 100 parts by weight of the acryl polymer, wherein the pressure sensitive adhesive composition satisfies General Formula 1 or 2:

$$95\% \geq (X2/X1) \times 100 = \Delta X \quad \text{[General Formula 1]}$$

$$106\% \leq (Y2/Y1) \times 100 = \Delta Y \quad \text{[General Formula 2]}$$

sensitive adhesive from the pressure sensitive adhesive composition is attached to glass and a load of 1 kg is applied to the specimen for 500 seconds, and the peel strength is measured when the specimen is attached to glass and then peeled from the glass in a longitudinal direction at 25° C. at a peeling rate of 5 mm/sec at a peeling angle of 180 degrees.

2. The pressure sensitive adhesive composition of claim 1, wherein the pressure sensitive adhesive composition satisfies General Formulas 1 and 2.

3. The pressure sensitive adhesive composition of claim 1, wherein the acryl polymer has a glass transition temperature of 10° C. or less.

4. The pressure sensitive adhesive composition of claim 1, wherein the acryl polymer comprises a polymerization unit induced from a copolymeric monomer containing a hydroxyl group or a carboxyl group in an amount of 0.05 parts by weight to 30 parts by weight and a (meta)acrylic acid ester compound in an amount of 70 parts by weight to 99.95 parts by weight.

5. The pressure sensitive adhesive composition of claim 1, wherein the polyphenolic compound is a compound expressed by Chemical Formula 1:

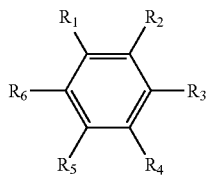

[Chemical Formula 1]

wherein in Chemical Formula 1, $R_1$ to $R_6$ independently represent hydrogen, a hydroxyl group, an epoxy group, a carboxyl group, an alkyl group, an alkoxy group, an alkenly group, an alkynyl group, or an isocyanate group, and two or more of the $R_1$ to $R_6$ in Chemical Formula 1 are hydroxyl groups (except cases where $R_1$ and $R_4$, $R_2$ and $R_5$, or $R_3$ and $R_6$ are hydroxyl groups simultaneously).

6. The pressure sensitive adhesive composition of claim 1, wherein the polyphenolic compound has a substituent of Chemical Formula 2:

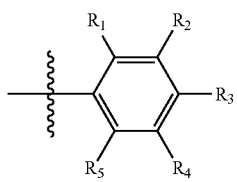

[Chemical Formula 2]

wherein in Chemical Formula 2, $R_1$ to $R_5$ independently represent hydrogen, a hydroxyl group, an epoxy group, a carboxyl group, an alkyl group, an alkoxy group, an alkenly group, an alkynyl group, or an isocyanate group, and two or more of the $R_1$ to $R_5$ are hydroxyl groups (except cases where $R_1$ and $R_4$ or $R_2$ and $R_5$ are hydroxyl groups simultaneously).

7. The pressure sensitive adhesive composition of claim 1, wherein the polyphenolic compound has a molecular weight of 100 g/mol to 30,000 g/mol.

8. The pressure sensitive adhesive composition of claim 1, wherein the polyphenolic compound comprises 1,2-benzenediol, 1,3-benzenediol, 1,2,3-benzentriol, catechin, a gallic acid, a tannic acid, or quercetin.

9. The pressure sensitive adhesive composition of claim 1, wherein the polyphenolic compound is contained in an extract obtained from a fruit skin or seeds of a plant.

10. The pressure sensitive adhesive composition of claim 9, wherein the fruit skin or the seeds of the plant comprise grape seeds, apricot seeds, grape skin, apple skin, or pear skin.

11. The pressure sensitive adhesive composition of claim 1, wherein the polyphenolic compound is comprised in an amount of 0.1 parts by weight to 15 parts by weight relative to 100 parts by weight of the acryl polymer.

12. The pressure sensitive adhesive composition of claim 1, further comprising:
a multifunctional cross-linker in an amount of 0.01 parts by weight to 10 parts by weight relative to 100 parts by weight of the acryl polymer.

13. The pressure sensitive adhesive composition of claim 1, wherein the pressure sensitive adhesive composition has a gel fraction calculated by Formula 3 in a range of 40% to 80%:

$$\text{Gel fraction}(\%) = 100 \times A/B \quad [\text{Formula 3}]$$

wherein in Formula 3, B represents a weight of the pressure sensitive adhesive composition comprising a cross-linked structure, and A represents a dry weight of insolubles remaining after the pressure sensitive adhesive composition having the weight B is kept in ethyl acetate for 72 hours.

14. A pressure sensitive adhesive comprising:
the pressure sensitive adhesive composition comprising a cross-linked structure of claim 1.

* * * * *